(12) United States Patent
Sheepwash et al.

(10) Patent No.: US 12,319,795 B2
(45) Date of Patent: Jun. 3, 2025

(54) RUBBER COMPOSITIONS PREPARED WITH A POLAR POLYSULFIDE CROSSLINKING AGENT

(71) Applicant: BRIDGESTONE CORPORATION, Tokyo (JP)

(72) Inventors: Erin Sheepwash, Cuyahoga Falls, OH (US); Rita E. Cook, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 569 days.

(21) Appl. No.: 17/758,154

(22) PCT Filed: Dec. 30, 2020

(86) PCT No.: PCT/US2020/067460
§ 371 (c)(1),
(2) Date: Jun. 29, 2022

(87) PCT Pub. No.: WO2021/138417
PCT Pub. Date: Jul. 8, 2021

(65) Prior Publication Data
US 2023/0030838 A1    Feb. 2, 2023

Related U.S. Application Data

(60) Provisional application No. 62/954,995, filed on Dec. 30, 2019.

(51) Int. Cl.
*C08J 3/24* (2006.01)
*B60C 1/00* (2006.01)
*C08K 3/36* (2006.01)

(52) U.S. Cl.
CPC ............. *C08J 3/243* (2013.01); *B60C 1/0016* (2013.01); *C08K 3/36* (2013.01); *C08J 2309/06* (2013.01)

(58) Field of Classification Search
CPC ..................................... C08J 3/24; C08K 3/36
USPC ....................................................... 524/547
See application file for complete search history.

(56) References Cited

U.S. PATENT DOCUMENTS

| | | |
|---|---|---|
| 7,368,506 B2 | 5/2008 | Kanenari |
| 8,846,170 B2 | 9/2014 | Cruse et al. |
| 8,987,387 B2 | 3/2015 | Kwag et al. |
| 9,228,064 B2 | 1/2016 | Uenishi et al. |
| 9,447,263 B2 | 9/2016 | Feldhues et al. |
| 9,475,924 B2 | 10/2016 | Kameda et al. |
| 9,637,619 B2 | 5/2017 | Feldhues et al. |
| 9,752,020 B2 | 9/2017 | Wang et al. |
| 9,771,462 B2 | 9/2017 | Evans et al. |
| 9,868,853 B2 | 1/2018 | Hogan |
| 9,926,440 B2 | 3/2018 | Lin et al. |
| 2014/0135437 A1 | 5/2014 | Sandstrom et al. |
| 2015/0141582 A1 | 5/2015 | Yan et al. |
| 2015/0274655 A1 | 10/2015 | Feldhues et al. |
| 2016/0333151 A1 | 11/2016 | Kayashima et al. |
| 2019/0106546 A1 | 4/2019 | Kayashima et al. |

FOREIGN PATENT DOCUMENTS

| | | | |
|---|---|---|---|
| JP | 2016-500701 A | 1/2016 | |
| JP | 2016-153482 A | 8/2016 | |
| KR | 10-2019-0064351 A | 6/2019 | |
| WO | WO-03087212 A1 * | 10/2003 | ............... B60C 1/00 |
| WO | WO-2003087212 A1 * | 10/2003 | ............... B60C 1/00 |

OTHER PUBLICATIONS

International Search Report and Written Opinion issued in PCT/US2020/067460; Mailing Date: May 4, 2021.

* cited by examiner

*Primary Examiner* — Deve V Hall
(74) *Attorney, Agent, or Firm* — Meredith E. Hooker; J. Gregory Chrisman

(57) ABSTRACT

A vulcanizate prepared by a method comprising introducing an elastomer, a filler, and a polar polysulfide crosslinking agent to form a masterbatch and introducing a curative to the masterbatch to form a vulcanizable composition. Vulcanizing the composition to graft the polar group from the crosslinking agent onto an elastomer to increase the hydrophilicity of the composition.

21 Claims, 4 Drawing Sheets

RUBBER COMPOSITIONS PREPARED WITH A POLAR POLYSULFIDE CROSSLINKING AGENT

TECHNICAL FIELD

The present disclosure relates to the use of an oligomeric crosslinking agent that includes a polar group in rubber compositions and, in particular, grafting polar functionalities from a polar group of a polysulfide crosslinking agent onto diene-based polymer chains in a vulcanizable rubber composition to increase the hydrophilicity of the composition.

BACKGROUND

Rubber tires have many properties that affect performance such as rolling resistance and wet road traction. Traction performance is a main property for tire treads and is an important factor for evaluating tire ability on wet surfaces such as snow and ice. Methods of improving tire properties include incorporation of components in a rubber composition. In a method of improving stability on wet road surfaces, silica and polyethylene glycol can be used as an additive. The use of silica, in large amounts, can be disadvantageous as the viscosity of rubber increases and dispersibility at kneading tends to decrease. To improve dispersibility of the silica, polyethylene glycol can be added.

The polyethylene glycol additive contains a hydroxyl group, which can be employed with an elastomer to improve wet traction. For example, U.S. Publication No. 2005/0234182 discloses the use of polyethylene glycol and a butadiene rubber having a hydroxyl group in the molecular chain for improving wet grip properties. The use of polyethylene glycol as an additive showed minimal improvement in wet grip properties and would negatively affect rolling resistance.

It would be desirable to have a crosslinker for vulcanizable elastomers that improves wet traction properties while not negatively impacting other properties like rolling resistance. The present invention utilizes a polar group crosslinking agent that can chemically attach polar groups, such as glycol, to polymer chains in a rubber composition for increasing wet traction properties. The crosslinking agent can be used during mixing of the rubber composition for grafting one or more polymers, which eliminates the need to carryout post-polymerization reactions.

SUMMARY

In a first aspect, disclosed is a vulcanizate prepared by a method including combining an elastomer, a filler and a polysulfide crosslinking agent having one or more polar groups to form a masterbatch and adding a curative to the masterbatch to form a vulcanizable composition.

In an example of aspect 1, the elastomer is a diene-based elastomer.

In another example of aspect 1, the filler includes silica, carbon black, or a combination thereof.

In another example of aspect 1, the polysulfide crosslinking agent includes styrene.

In another example of aspect 1, the one or more polar groups of the polysulfide crosslinking agent has a structure with $—CO_2R_1$, wherein $R_1$ is an alkyl, alkoxy, diol, ether, carbonyl or hydroxyl.

In another example of aspect 1, the polysulfide crosslinking agent is poly(S-Sty-r), wherein S is sulfur, Sty is styrene, and r is a polar group, the polar group of the polysulfide crosslinking agent has a structure of $—CO_2R_1$, wherein $R_1$ is an alkyl, alkoxy, diol, ether, carbonyl or hydroxyl.

In another example of aspect 1, the step of combining introduces from about 5 to about 200 parts by weight of the filler per one hundred parts by weight of the elastomer and from about 0.5 to about 20 parts by weight of the polysulfide crosslinking agent per one hundred parts by weight of the elastomer.

In another example of aspect 1, the vulcanizate is a tire component, for example, a tire tread.

In a second aspect, there is a vulcanizable composition that includes an elastomer, from about 0.5 to about 20 parts by weight of polysulfide crosslinking agent comprising a polar group per one hundred parts by weight of the elastomer, from about 5 to about 200 parts by weight of filler per one hundred parts by weight of the elastomer, and a curative for the elastomer.

In an example of aspect 2, the polysulfide crosslinking agent is a distinct species in the vulcanizable composition.

In another example of aspect 2, the polysulfide crosslinking agent is covalently bonded to the elastomer.

In another example of aspect 2, the polar group of the polysulfide crosslinking agent comprises $—CO_2R_1$, wherein $R_1$ is an alkyl, alkoxy, diol, ether, carbonyl or hydroxyl.

In another example of aspect 2, the polysulfide crosslinking agent is poly(S-Sty-r), wherein S is sulfur, Sty is styrene, and r is a polar group, the polar group comprises $—CO_2R_1$, wherein $R_1$ is an alkyl, alkoxy, diol, ether, carbonyl or hydroxyl.

In another example of aspect 2, the vulcanizable composition is used in the preparation of a tire tread.

In another example of aspect 2, the vulcanizable composition further includes a graft copolymer prepared by reacting the polysulfide crosslinking agent with the elastomer, wherein the elastomer is a diene-based elastomer.

In another example of aspect 2, the graft copolymer is prepared by introducing the diene-based elastomer and the polysulfide crosslinking agent to form a mixture, and subjecting the mixture to conditions that will react the polysulfide crosslinking agent to the diene-based elastomer.

In a third aspect, there is disclosed an oligomeric polysulfide compound comprising a polar group represented by the following Formula (I): poly(S-Sty-r), wherein S is sulfur, Sty is styrene, and r is a polar group, the polar group comprises $—CO2R1$, wherein $R1$ is an alkyl, alkoxy, diol, ether, carbonyl or hydroxyl.

In a fourth aspect, disclosed is a method for preparing a tire, the method includes combining an elastomer, a filler, and a polysulfide crosslinking agent including one or more polar groups to form a masterbatch, adding a curative to the masterbatch to form a vulcanizable composition, forming the vulcanizable composition into a green tire component, building a green tire by incorporating the green tire component formed with the vulcanizable composition, and subjecting the green tire to curing conditions to form a vulcanized tire.

In an example of aspect 4, the filler comprises silica and the tire component is a tire tread.

In another example of aspect 4, the curing conditions for the green tire cause the polysulfide crosslinking agent to react with the elastomer, wherein the elastomer is a diene-based elastomer.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

Additional features and advantages will be set forth in the detailed description which follows, and in part will be readily apparent to those skilled in the art from that description or recognized by practicing the embodiments as described herein, including the detailed description which follows, the claims. It is to be understood that both the foregoing general description and the following detailed description are merely exemplary, and are intended to provide an overview or framework to understanding the nature and character of the claims.

BRIEF DESCRIPTION OF THE DRAWINGS

The above and other features, examples and advantages of aspects or examples of the present disclosure are better understood when the following detailed description is read with reference to the accompanying drawings, in which.

DETAILED DESCRIPTION

Figure 1:
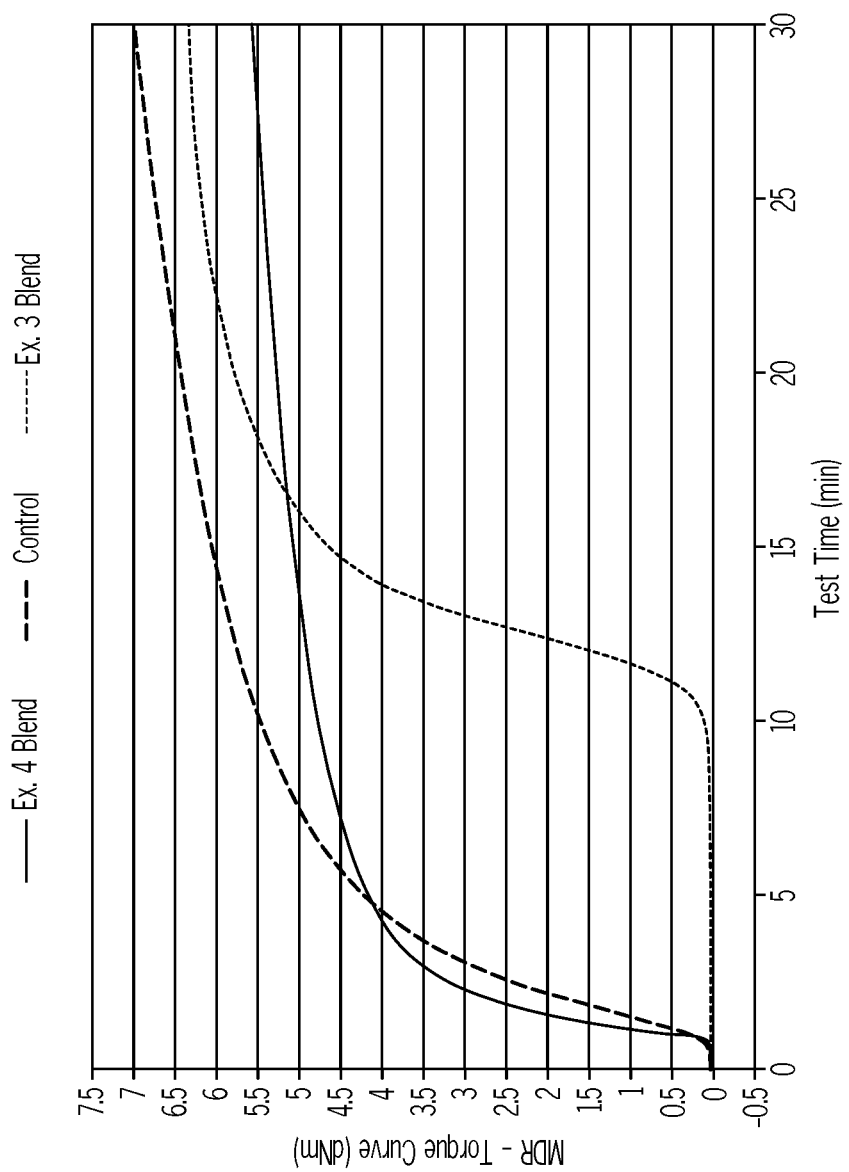
FIG. 1 is a graphical plot MDR torque curve versus cure time for both control and grafted polymers prepared according to one or more embodiments of the present invention.

The terminology as set forth herein is for description of the embodiments only and should not be construed as limiting the invention as a whole.

Herein, when a range such as 5-25 (or 5 to 25) is given, this means preferably at least or more than 5 and, separately and independently, preferably not more or less than 25. In an example, such a range defines independently 5 or more, and separately and independently, 25 or less.

The present disclosure relates to the discovery of a rubber vulcanizate that is prepared from a vulcanizable composition that includes a polysulfide crosslinking agent with a polar group. The vulcanizate of one or more embodiments advantageously demonstrates one or more of relatively low hysteretic loss and relatively high wet skid resistance. As a result, the vulcanizates of this invention are advantageously useful as a tire component, for example, tire treads.

In one or more embodiments, the vulcanizable compositions of matter of this invention are prepared by combining an elastomer, a filler, a curative, and a polysulfide crosslinking agent with a polar group. Other optional ingredients may include those ingredients that are included in vulcanizable compositions of this nature including, but not limited to, cure activators, cure accelerators, oils, resins, plasticizers, pigments, fatty acids, zinc oxide, and peptizing agents. In one or more of these embodiments, it is believed that the polysulfide crosslinking agent reacts with the elastomer (e.g. a diene-based elastomer) to form a graft copolymer containing polar functionalities on the polymer chains. In one or more embodiments, this reaction is believed to take place in situ during solid-state mixing of the elastomer and the polysulfide crosslinking agent with a polar group at one or more appropriate conditions that lead to graft copolymer formation.

In other embodiments, the graft polymer or copolymer is pre-formed by reacting a diene-based elastomer with the polysulfide crosslinking agent containing a polar group. This graft polymer or copolymer may then be employed to form a vulcanizable composition of matter by combining this grafted polymer with optional additional elastomer, filler, and curative.

In one or more embodiments, the elastomer employed to prepare the vulcanizable compositions may include those polymers that can be vulcanized to form compositions possessing rubbery or elastomeric properties. The elastomers can include natural and synthetic rubbers. The elastomers can include those that react with the polysulfide crosslinking agents containing a polar group or they can include those otherwise added to and present with the vulcanizable composition of matter. That is, the vulcanizable compositions may include elastomers other that those that react with the polysulfide crosslinking agent with at least one polar group.

In one or more embodiments, an elastomer can be a diene-based elastomer, for instance those that include synthetic rubbers that derive from the polymerization of conjugated diene monomer or the copolymerization of conjugated diene monomer with one or more comonomer such as vinyl-substituted aromatic monomer. As used herein, elastomers deriving from the polymerization of conjugated dienes may be referred to as diene-based elastomers. Conjugated diene monomers include, but are not limited to, 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and combinations thereof. As suggested above, the diene-based elastomer can include copolymers where the conjugated diene is copolymerized with comonomer such as, but not limited to, vinyl aromatic monomer such as styrene, a-methylstyrene, p-methylstyrene, o-methylstyrene, p-butylstyrene, vinylnaphthalene, and combinations thereof.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures. These elastomers may also include one or more functional units, which typically include heteroatoms.

In one or more embodiments, useful elastomers include high molecular weight polymers such as those having a number average molecular weight in excess of 50 kg/mol, in other embodiments in excess of 100 kg/mol, in other embodiments in excess of 125 kg/mol, and in other embodiments in excess of 150 kg/mol.

The vulcanizable compositions can include one or more fillers. The filler can include one or more conventional reinforcing or non-reinforcing fillers. For example, useful fillers include carbon black, silica, alumina, and silicates such as calcium, aluminum, magnesium silicates, and combinations thereof. In some embodiments, the vulcanizable compositions can include a silica filler used in combination with a silica coupling agent.

In one or more embodiments, carbon black fillers can include furnace blacks, channel blacks, and lamp blacks. Examples of carbon blacks include super abrasion furnace (SAF) blacks, intermediate super abrasion furnace (ISAF) blacks, high abrasion furnace (HAF) blacks, fast extrusion furnace (FEF) blacks, fine furnace (FF) blacks, semi-reinforcing furnace (SRF) blacks, medium processing channel blacks, hard processing channel blacks, conducting channel blacks, and acetylene blacks. Representative carbon blacks useful in one or more embodiments may include those designated by ASTM D1765 as N326, N330, N339, N343, N347, N351, N358, N550, N650, N660, N762, N772, and N774.

The carbon black fillers can have a surface area (EMSA) of about 20 $m^2/g$ or more, in other embodiments about 35 $m^2/g$ or more, in other embodiments about 50 $m^2/g$ or more, in other embodiments about 60 $m^2/g$ or more. Surface area values can be determined by ASTM D-1765, for example, using the cetyltrimethylammonium bromide (CTAB) technique. In other embodiments, tire components, such as a sidewall, include carbon black filler having a surface area (EMSA) of from about 60 to about 110 $m^2/g$. The carbon black can be in a pelletized form or an unpelletized flocculent form. The preferred form of carbon black may depend upon the type of mixing equipment used to mix the vulcanizable rubber compositions. Exemplary carbon blacks that are useful in the practice of this invention include those characterized by ASTM D-1765, such as N-110, N-220, N-339, N-330, N-351, N-550, N-660, and N990 grades.

In one or more embodiments, the filler can include silica, for instance in combination with carbon black. When silica is used as a filler, the silica may be employed in conjunction with a coupling agent. In these or other embodiments, the silica may be used in conjunction with a silica dispersing agent.

In one or more embodiments, useful silicas include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. In some embodiments, the silica is a precipitated amorphous wet-processed hydrated silica. In one or more embodiments, the silica is produced by a chemical reaction in water, from which it is precipitated as ultra-fine, spherical particles. These primary particles are believed to strongly associate into aggregates, which in turn combine less strongly into agglomerates.

Some commercially available silicas that may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

In one or more embodiments, silicas may be characterized by their surface areas, which give a measure of their reinforcing character. The Brunauer, Emmet and Teller ("BET") method (described in J. Am. Chem. Soc., vol. 60, p. 309 et seq.) is a recognized method for determining the surface area. The BET surface area of silica is generally about 450 $m^2/g$ or less. Useful ranges of surface area include from about 32 to about 400 $m^2/g$, about 100 to about 250 $m^2/g$, about 150 to about 220 $m^2/g$, and subranges therein.

In one or more embodiments, the pH of silica may be from about 5 to about 7 or slightly over 7, or in other embodiments from about 5.5 to about 6.8.

In one or more embodiments, useful silica coupling agents include sulfur-containing silica coupling agents. Examples of sulfur-containing silica coupling agents include bis(trialkoxysilylorgano)polysulfides or mercapto-organoalkoxysilanes. Types of bis(trialkoxysilylorgano)polysulfides include bis(trialkoxysilylorgano)disulfide and bis(trialkoxysilylorgano)tetrasulfides. Exemplary silica dispersing aids include, but are not limited to an alkyl alkoxysilane, a fatty acid ester of a hydrogenated or non-hydrogenated $C_5$ or $C_6$ sugar, a polyoxyethylene derivative of a fatty acid ester of a hydrogenated or non-hydrogenated $C_5$, or $C_6$ sugar, and mixtures thereof, or a mineral or non-mineral additional filler.

Other useful fillers that may be used, especially in combination with silica and/or carbon black include, but are not limited to, mineral fillers such as clay (e.g., hydrous aluminum silicate), talc (hydrous magnesium silicate), aluminum hydrate ($Al(OH)_3$), and mica, as well as metal oxides such as aluminum oxide, and the like. Additional useful fillers suitable for use in the rubber compositions disclosed herein are known to those skilled in the art.

The rubber compositions can include one or more curatives. A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3.sup.rd Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, ($2^{nd}$ Ed. 1989), which are incorporated herein by reference. In one or more embodiments, the curative is sulfur or derivative thereof. Examples of suitable sulfur vulcanizing agents include soluble sulfur; sulfur donating vulcanizing agents, such as an amine disulfide, polymeric polysulfide or sulfur olefin adducts; and insoluble polymeric sulfur. Vulcanizing agents, as disclosed herein, can be used alone or in combination.

In one or more embodiments, the curative is employed in combination with a cure accelerator. In one or more embodiments, accelerators are used to control the time and/or temperature required for vulcanization and to improve properties of the vulcanizate. Examples of cure accelerators include, but are not limited to, thiazol vulcanization accelerators, such as 2-mercaptobenzothiazol, dibenzothiazyl disulfide, N-cyclohexyl-2-benzothiazyl-sulfenamide (CBS), and the like, and guanidine vulcanization accelerators, such as diphenylguanidine (DPG) and the like.

Polysulfide Crosslinking Agent

In one or more embodiments, the oligomeric crosslinking agent containing one or more polar groups is sued to graft polar functionalities from the one or more polar groups of the crosslinking agent, for example a polysulfide crosslinking agent, onto a diene-based polymer. The polar group-containing crosslinking agent is not particularly limited as long as it is an agent containing within the molecule thereof at least one polar group. Specific examples of the polar group contained in the polar group-containing crosslinking agent include an amino group, an imino group, a nitrile group, an ammonium group, an imide group, an amide group, a hydrazo group, an azo group, a diazo group, a hydroxyl group, a carboxyl group, an acrylate group, a carbonyl group, an epoxy group, an oxycarbonyl group, a sulfide group, a disulfide group, a sulfonyl group, a sulfinyl group, a thiocarbonyl group, a nitrogen-containing heterocyclic group, an oxygen-containing heterocyclic group, an alkoxysilyl group, and a tin-containing group. These polar group-containing crosslinking agents may be used alone or in combination of two or more of them. The polar group-containing crosslinking agent may contain one or two or more of these polar groups.

Examples of the hydroxyl polar groups for the hydroxyl group-containing crosslinking agent include at least one of each of primary, secondary and tertiary hydroxyl groups. Examples hydroxyl groups include hydroxy alkyls (e.g., hydroxyethyl, hydroxypropyl, hydroxybutyl). Examples of glycol polar groups include glycols (e.g., polyethylene glycol, polypropylene glycol, polyalkylene glycols), having, for example, 2 to 23 alkylene glycol units. Examples of acrylate polar groups include acrylates or alkyl acrylates (e.g., n-butyl acrylate, hexyl acrylate, octadecyl acrylate, 2-hydroxyethyl (meth)acrylate, 2-hydroxypropyl (meth)acrylate, 3-hydroxypropyl (meth)acrylate, 2-hydroxybutyl (meth) acrylate, 3-hydroxybutyl (meth)acrylate, and 4-hydroxybutyl (meth)acrylate; mono(meth)acrylates of polyalkylene glycol). Examples of the carboxyl groups include unsaturated carboxylic acids such as (meth)acrylic acid, maleic acid, fumaric acid, itaconic acid, tetraconic acid, and cinnamic acid; and free carboxyl group-containing molecules such as monoesters of nonpolymerizable polyvalent carboxylic acids such as phthalic acid, succinic acid, and adipic acid and hydroxy group-containing unsaturated compounds such as (meth)allyl alcohol and 2-hydroxyethyl (meth)acrylate.

In one or more embodiments, the crosslinking agent is a polysulfide containing one or more polar groups. The polysulfide crosslinking agent can be represented as poly(S-r), wherein the r group is one or more polar groups the r group is one or more polar groups (e.g., hydroxyl, carbonyl, glycol, etc.). In one or more embodiments, the polysulfide compound can further include one or more styrene groups and be a terpolymer. The polysulfide containing a styrene group and a polar group can be represented as poly(S-r-Sty) or poly(S-Sty-r), wherein the r group is one or more polar groups and the Sty group is one or more styrene groups or units. Preferably, the polar group contains a hydroxyl, acrylate, glycol group or unit, or a combination thereof. In one example, the polysulfide crosslinking agent can be poly(S-acrylate-Sty). The acrylate group can be, for instance, n-butyl acrylate, hexyl acrylate, octadecyl acrylate, 2-hydroxyethyl (meth)acrylate, 2-hydroxypropyl (meth)acrylate, 3-hydroxypropyl (meth)acrylate, 2-hydroxybutyl (meth) acrylate, 3-hydroxybutyl (meth)acrylate, and 4-hydroxybutyl (meth)acrylate; mono(meth)acrylates of polyalkylene glycol. In other embodiments, the acrylate group can be represented by —$CO_2R_1$, wherein $R_1$ is an alkyl, alkoxy, diol, ether, carbonyl or hydroxyl.

The polysulfide crosslinking agent can be formed by reacting sulfur (e.g., S8) with a polar compound, or further in combination with styrene. The sulfur component of the polysulfide crosslinking agent can be in the range of about 5 to about 60 weight percent, about 10 to about 50 weight percent, about 15 to about 45 weight percent, or about 20, about 25, about 30, about 35 or about 40 weight percent of the polysulfide crosslinking agent. As discussed above, the polysulfide crosslinking agent can include styrene in addition to a polar component. The styrene component, if present, of the polysulfide crosslinking agent can be in the range of about 2 to about 40 weight percent, about 4 to about 30 weight percent, about 5 to about 25 weight percent, or about 8, about 10, about 12, about 15, about 18 or about 20 weight percent of the polysulfide crosslinking agent. The polysulfide crosslinking agent can include a polar group or component, or in certain embodiments two or more polar groups. The total polar group content of the polysulfide crosslinking agent can be in the range of about 15 to about 75 weight percent, about 25 to about 70 weight percent, about 30 to about 65 weight percent, or about 35, about 40, about 45, about 50, about 55 or about 60 weight percent of the polysulfide crosslinking agent.

The sulfur component of the polysulfide crosslinking agent can be in a ratio to the total polar group content of 0.25:1 to 1:0.25, 0.5:1 to 1:0.5 or 0.75:1 to 1:0.75. The styrene component of the polysulfide crosslinking agent can be in a ratio to the total polar group content of 0.1:1 to 1:0.1, 0.2:1 to 1:0.2 or 0.3:1 to 1:0.3. The styrene component of the polysulfide crosslinking agent can be in a ratio to the sulfur content of 0.2:1 to 1:0.2, 0.3:1 to 1:0.3 or 0.4:1 to 1:0.4.

Other ingredients that are typically employed in rubber compounding may also be added to the rubber compositions. These include oils, plasticizer, waxes, scorch inhibiting agents, processing aids, zinc oxide, tackifying resins, reinforcing resins, fatty acids such as stearic acid, peptizers and antidegradants such as antioxidants, antiozonants, and waxes. In particular embodiments, the oils that are employed include those conventionally used as extender oils, which are described above. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Ingredient Amounts

In one or more embodiments, the vulcanizable compositions include 20 or more, in other embodiments 30 or more, and in other embodiments 40 or more percent by weight of the rubber component, based upon the entire weight of the composition. In these or other embodiments, the vulcanizable compositions include 90 or less, in other embodiments 70 or less, and in other embodiments 60 or less percent by weight of the rubber component based on the entire weight of the composition. In one or more embodiments, the vulcanizable compositions include from about 20 to about 90, in other embodiments from about 30 to about 70, and in other embodiments from about 40 to about 60 percent by weight of the rubber component based upon the entire weight of the composition.

In one or more embodiments, the vulcanizable compositions include 5 or more, in other embodiments 25 or more, and in other embodiments 40 or more parts by weight (pbw) filler (e.g. silica) per 100 parts by weight rubber (phr). In these or other embodiments, the vulcanizable composition includes 200 or less, in other embodiments 120 or less, and in other embodiments 70 or less pbw of the filler phr. In one or more embodiments, the vulcanizable composition includes from about 5 to about 200, in other embodiments from about 10 to about 100, in other embodiments from about 25 to about 120, and in other embodiments from about 40 to about 70 pbw of filler phr.

Polysulfide Crosslinking Agent

In one or more embodiments, the vulcanizable compositions include 1 or more, in other embodiments 2 or more, in other embodiments 3 or more, in other embodiments 4 or more, and in other embodiments 5 or more parts by weight (pbw) polar-containing crosslinking agent per 100 parts by weight rubber (phr). In these or other embodiments, the vulcanizable composition includes 20 or less, in other embodiments 15 or less, in other embodiments 12 or less, and in other embodiments 10 or less pbw polar-containing crosslinking agent phr. In one or more embodiments, the vulcanizable composition includes from about 1 to about 20, in other embodiments from about 3 to about 12, and in other embodiments from about 5 to about 10 pbw polar-containing crosslinking agent phr. In one or more embodiments, reference to the amount of polar-containing crosslinking agent refers to the unreacted polar-containing crosslinking agent as it exists prior to any reaction with a diene-based elastomer. Inasmuch as the weight of the reacted polar-containing crosslinking agent will not appreciably change upon reaction (e.g. a grafting reaction) with a diene-based elastomer, reference may also be made to the weight of the polar-containing crosslinking agent residue of the graft copolymer (i.e. the polar portion of the graft copolymer formed by reacting the polar-containing crosslinking agent with a diene-based elastomer).

The skilled person will be able to readily select the amount of vulcanizing agents to achieve the level of desired cure. Also, the skilled person will be able to readily select the amount of cure accelerators to achieve the level of desired cure.

All ingredients of the vulcanizable compositions can be mixed with standard mixing equipment such as Banbury or Brabender mixers, extruders, kneaders, and two-rolled mills. In one or more embodiments, this may include a multi-stage mixing procedure where the ingredients are mixed in two or more stages. For example, in a first stage (e.g., a masterbatch mixing stage), the elastomer, filler and optionally the polysulfide crosslinking agent with a polar group is mixed. This mixing, which takes place in the absence of the curative, can proceed at temperature above which the curing would otherwise take place if the curative was present. For example, this mixing can take place at temperatures about 120° C. or more, in other embodiments about 130° C. or more, in other embodiments about 140° C. or more, and in other embodiments in about 150° C. In one or more embodiments, it is believed that these conditions are sufficient to affect a reaction between the diene-based elastomer and the polysulfide crosslinking agent containing a polar group.

Once the masterbatch is prepared, the vulcanizing agents may be introduced and mixed into the masterbatch in a final mixing stage, which is typically conducted at relatively low temperatures, for example, to reduce the chances of premature vulcanization. For example, this mixing may take place at temperatures about 120° C. or less, in other embodiments about 110° C. or less, and in other embodiments about 100° C. or less. Additional mixing stages, sometimes called remills, can be employed between the masterbatch mixing stage and the final mixing stage.

As discussed above, in one or more embodiments, the polysulfide crosslinking agent containing a polar group reacts with a diene-based elastomer to form a graft copolymer where the one or more polar groups extend from the diene-based elastomer as a graft. Without wishing to be bound by any particular theory, it is believed that the polar and sulfur functionality of the polysulfide crosslinking agent reacts with unsaturation along the backbone of the diene-based elastomer to thereby form a covalent bond that results in a polar group grafts at one or more locations along the backbone of the diene-based elastomer. Since the reaction is believed to take place at the unsaturation within the backbone of the diene-based polymer, the diene-based polymer need not otherwise be reactive. For example, in one or more embodiments, the reaction between the polysulfide crosslinking agent containing a polar group and the diene-based elastomer takes place while the diene-based elastomer is non-living. In accordance with certain embodiments, the polysulfide crosslinking agent containing a polar group reacts along the unsaturated diene polymer chain at a point at least about 1000 g/mol of polymer units from the terminus of the polymer chain. Alternatively, about 2000 g/mol of polymer units from the terminus of the polymer chain, or up to about 3000 g/mol remaining from the terminal of the polymer chain.

As also discussed above, where a reaction takes place between the polysulfide crosslinking agent containing a polar group and the diene-based elastomer, the reaction can take place in situ, which refers to a reaction taking place in the presence of at least one additional ingredient of the vulcanizable composition, such as the filler (e.g., silica, carbon black). This in situ reaction can take place during formation of the masterbatch, which is during solid-state mixing. In other embodiments, the reaction can take place after formation of the masterbatch, such as in a remill. For example, the elastomer and the filler can be mixed, and then the polar group-functional elastomer can be added in a subsequent mixing step, such as remill. Mixing may continue either at elevated temperatures, such as those used to prepare the masterbatch, or remill mixing may take place at lower temperatures.

In other embodiments, the graft copolymer can be prepared in advance of the formation of the vulcanizable composition. For example, the polysulfide crosslinking agent containing a polar group and a diene-based elastomer may be mixed exclusive of other ingredients of the vulcanizable composition at conditions, such as temperature, sufficient to graft the polar group of the polysulfide crosslinking agent to the diene-based elastomer. The resulting mixture, which may include a grafted copolymer, can then be employed in the formation of the vulcanizable compositions of this invention.

The vulcanizable compositions of this disclosure can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. In particular embodiments, one or more of the compound ingredients, such as the polysulfide crosslinking agent containing a polar group or a graft copolymer resulting from a reaction between the polysulfide crosslinking agent containing a polar group and a diene-based copolymer, may become crosslinked or otherwise chemically bonded to the crosslinked rubber network. As the skilled person will appreciate, the amounts of the various ingredients, especially those that do not react, will remain within the cured tire component the same as they existed within the compound.

In one or more embodiments, the vulcanizable compositions of matter of the present disclosure are particularly useful for making tire treads. Pneumatic tires can be made as discussed in U.S. Pat. Nos. 5,866,171, 5,876,527, 5,931,211, and 5,971,046, which are incorporated herein by reference. For example, the various tire components can be prepared as green tire components (i.e., uncured tire components), and assembled into a green tire. The green tire can then be subjected to curing conditions to form a vulcanized tire wherein the various green components are generally adhered to one another through the vulcanization process. Depending upon the ultimate use for the rubber composition, it may be processed (e.g., milled) into sheets prior to being formed into any of a variety of components and then vulcanized, which typically occurs at about 5° C. to about 15° C. higher than the highest temperatures employed during the mixing stages, most commonly about 170° C.

In one or more embodiments, the vulcanizates of the present invention are characterized by an advantageous balance of properties. In particular embodiments, the vulcanizates are characterized by an advantageous balance between hysteretic loss, rolling resistance and wet skid resistance.

In one or more embodiments, the vulcanizates of the present invention are characterized by hydrophilic/hydrophobic properties. These properties are believed to contribute to enhance the wet skid resistance of the vulcanizate.

In these or other embodiments, the vulcanizates of the present invention are characterized by advantageous hysteretic loss properties, which is indicative of lower rolling resistance for tires including one or more components prepared from the compositions of this invention. In one or more embodiments, the vulcanizable composition of this invention therefore product vulcanizates characterized by not only in improved wet traction, but also lowers rolling resistance.

In accordance with certain embodiments, the surfaces of the vulcanized rubbers prepared from the rubber compositions disclosed herein exhibit an adjusted relative hydrophobicity or hydrophilicity as compared to the surfaces of vulcanized rubbers formed from rubber compositions prepared using the same formulation, but using conventional polymers instead of the polar-functional grafted polymer.

The adjustment of the relative hydrophobicity or hydrophilicity of the rubber surface can contribute to the enhancement of the wet traction performance of a tire tread made with the rubber compositions disclosed herein. As mentioned above, due to numerous complex factors involved, the quantitative mechanisms attributable to improved wet traction performance are not completely understood.

However, in combination with other of the complex factors involved, the adjusted relative hydrophobicity or hydrophilicity can act to enhance the wet traction performance, particularly, the wet skid resistance of a tire tread made from the rubber compositions disclosed herein. For example, tire treads having surfaces that are hydrophobic will tend to repulse the water at the tread surface and will likely facilitate the water drainage from between the tire tread's surface and the road surface.

Conversely, tire treads that have a hydrophilic surface will tend to attract water and are more likely to form "adhesive" capillary bridges between the tire tread's surface and the road surface. Thus, by adjusting the relative hydrophobicity or relative hydrophilicity as compared to a vulcanized rubber made from the same composition but with conventional grafted polymer instead of the polar group grafted polymer, the rubber compositions disclosed herein can contribute to the enhancement of the wet skid resistance of the tire tread.

Moreover, the use of the polar-functional (e.g., glycol, hydroxyl) grafted polymer does not significantly affect certain important bulk mechanical properties of such rubber, including but not limited to properties directed to dynamic viscoelasticity and tensile strength. Still further, the vulcanizates of one or more embodiments advantageously exhibit relatively low bleed of low molecular weight polymers, such as polysiloxanes, to the surface of the rubber compositions.

The following examples are for purposes of illustration only and are not intended to limit the scope of the claims which are appended hereto.

EXAMPLES

Example 1

Synthesis of Poly(S-Sty) Terpolymer Crosslinking Agent
Poly(S-Sty 70/30) (70 wt % S, 30 wt % Sty)

In a round bottom flask, sulfur ($S_8$, 60.46 g, 0.236 mol) was stirred at 135° C. until molten. Styrene (24.2 g, 0.232 mol) with remove inhibitor was added and the mixture was stirred at 135° C. for 72 hours, yielding a red-orange liquid.

Example 2

Poly(S-Sty-EGA 35/15/50) (35 wt % S, 15 wt % Sty, 50 wt % EGA)

To poly(S-Sty 70/30) prepared by Example 1 was added ethylene glycol methyl ether acrylate (EGA, 12.8 g, 12.65 mL) and the mixture was stirred at 170° C. for 96 hours. After cooling to room temperature, the mixture was diluted with a small amount of chloroform and filtered to remove unreacted sulfur. The solvent was then removed under a stream of nitrogen, yielding a dark-red-brown liquid.

Example 3

Preparation of Styrene Butadiene Rubber (SBR) with Poly (S-Sty-EGA) Terpolymer Crosslinker in Solution
SBR containing 3.1 wt % poly(S-Sty-EGA) (35 wt % S, 15 wt % Sty, 50 wt % EGA)

To SBR (20/55, 50 g) dissolved in toluene (400 mL) was added poly(S-Sty-EGA 35/15/50) from Example 2 to form a solution. The solution was agitated for about 1 minute at room temperature (25° C.) and then the polymer mixture was dried to remove solvent, first in a fume hood for 3 days and then in a vacuum oven at 50° C. for 24 hours.

Example 4

SBR containing 8 wt % poly(S-Sty-EGA) (35 wt % S, 15 wt % Sty, 50 wt % EGA)

To SBR (20/55, 50 g) dissolved in toluene (400 mL) was added poly(S-Sty-EGA 35/15/50) from Example 2 to form a solution. The solution was agitated for about 1 minute at room temperature (25° C.) and then the polymer mixture was dried to remove solvent, first in a fume hood for 3 days and then in a vacuum oven at 50° C. for 24 hours.

Example 5

Sulfur curatives were added to the dried SBRs of Examples 3 and 4 on a 2 roll mill at 60° C. The control composition and compositions of the blends of Examples 3 and 4 are shown below in Table 1.

TABLE 1

| Ingredient | Control | Ex. 3 Blend | Ex. 4 Blend |
|---|---|---|---|
| SBR | 100 | | |
| SBR + S + Sty + EGA (Ex. 3) | | 106.2 | |
| SBR + S + Sty + EGA (Ex. 4) | | | 116.1 |
| Sulfur | 1.3 | 1.3 | 1.3 |
| DPG | 0.2 | 0.2 | 0.2 |
| CBS | 1.7 | 1.7 | 1.7 |
| ZnO | 2.5 | 2.5 | 2.5 |
| Stearic Acid | 2 | 2 | 2 |

The cure properties were measured by MDR at 171° C. for 30 minutes and are listed in Table 2 below and shown in FIG. 1.

TABLE 2

|  | Control | Ex. 3 Blend | Ex. 4 Blend |
|---|---|---|---|
| MH-ML (dNm) | 6.37 | 5.6 | 7.03 |
| T52 dNm (min) | 12.4 | 1.62 | 2.22 |
| T10 (min) | 11.4 | 1.11 | 1.39 |
| T50 (min) | 13.2 | 2.12 | 3.74 |
| T90 (min) | 19.4 | 14 | 18 |

The data is Table 2 shows the polymers containing poly(S-Sty-EGA) terpolymer exhibited a faster scorch time and, for higher loading of the terpolymer (i.e. at 8 pbw), an increased state of cure. The faster scorch time and increased state of cure, as compared to the control polymer, evidences that the terpolymer is participating in the cure reaction and grafting onto the polymer chain of the SBR.

Figure 2:
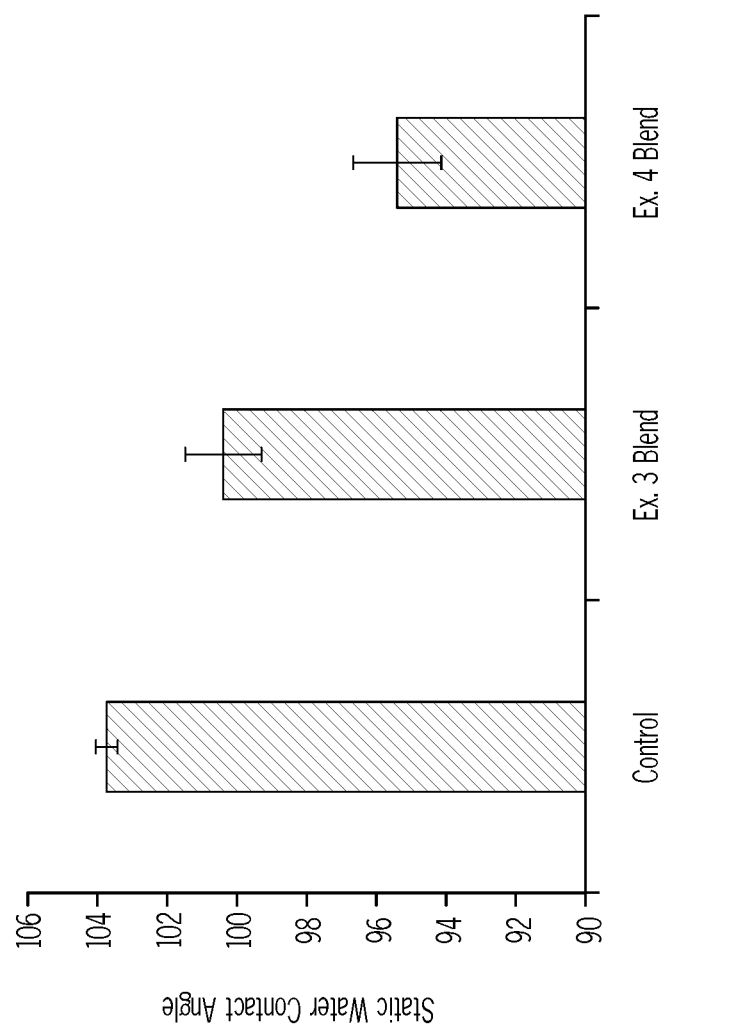
FIG. 2 is a graph of static water contact angle measurement for both control and grafted polymers prepared according to one or more embodiments of the present invention.

The static contact angle with water was measured on cured rubber slabs at room temperature. The values in FIG. 2 represent the average of 5 measurements. As seen in FIG. 2, the addition of poly(S-Sty-EGA) terpolymer resulted in a decrease in contact angle, indicating an increase in the polarity of the polymer as compared to the control polymer. An increase in polarity of the grafted polymer indicates that the compound has an increased adhesive component that leads to improved wet traction.

Figure 3:
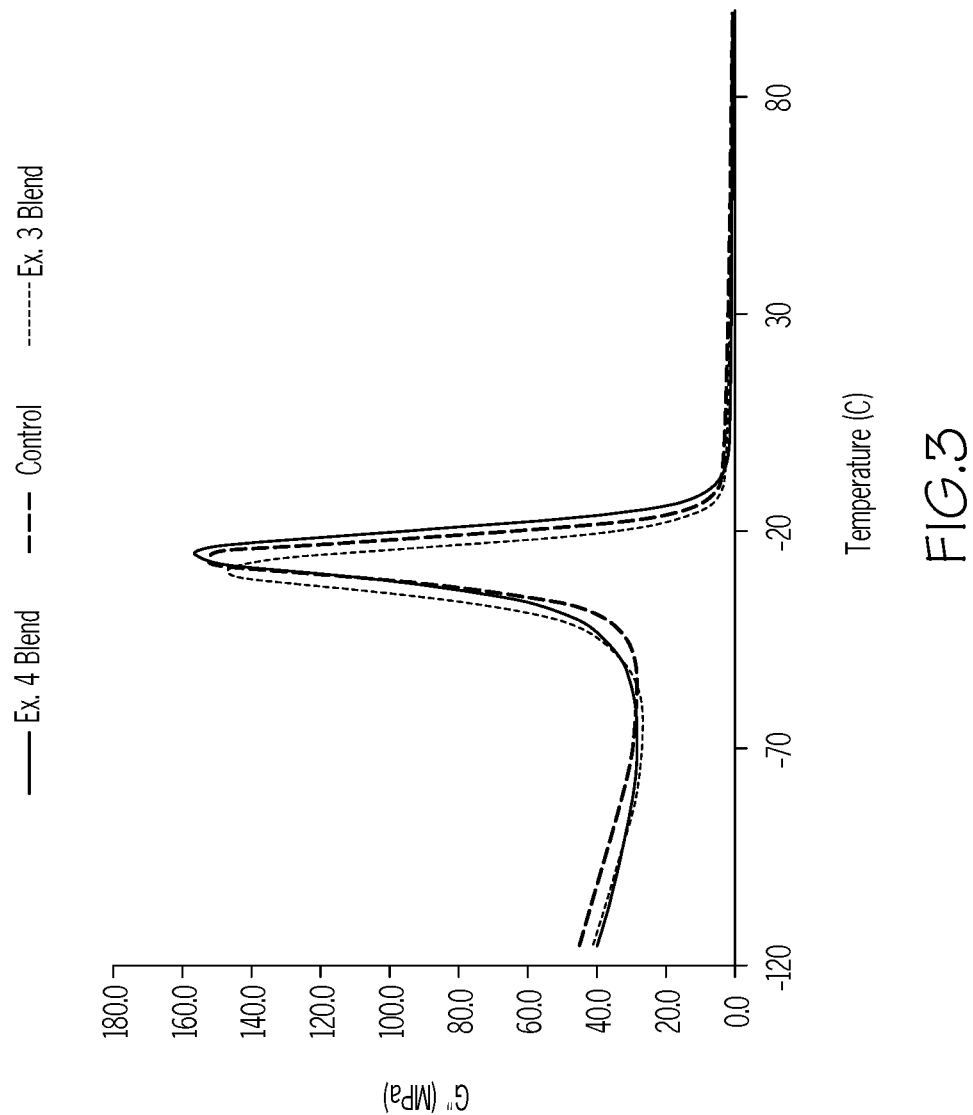
FIG. 3 shows a graph of G" values of rubber compositions over temperature ranging from −120° C. to 0° C.
Figure 4:
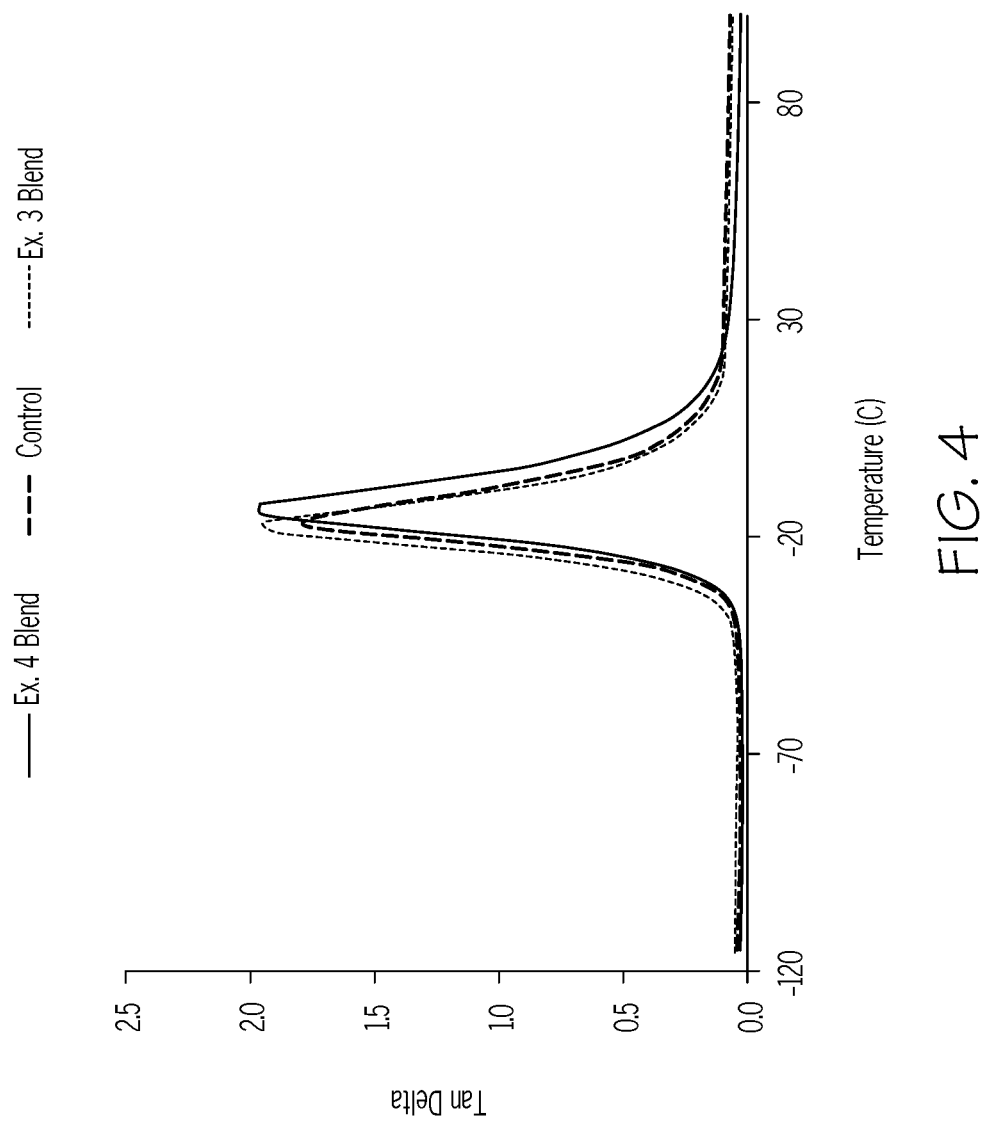
FIG. 4 shows a graph of tan δ (delta) values of rubber compositions over temperature ranging from −120° C. to 80° C.

As can be seen in FIG. 4, the tan δ is increased by the addition of poly(S-Sty-EGA) terpolymer. FIG. 3 shows that the loss modulus, G", is comparable to the control.

While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

The invention claimed is:

1. A vulcanizate prepared by a method comprising:
   a. combining an elastomer, a filler and a polysulfide crosslinking agent comprising a polar group to form a masterbatch, and
   b. adding a curative to the masterbatch to form a vulcanizable composition.

2. The vulcanizate of claim 1, wherein the elastomer is a diene-based elastomer.

3. The vulcanizate of claim 1, wherein the filler comprises silica.

4. The vulcanizate of claim 1, wherein the polysulfide crosslinking agent comprises styrene.

5. The vulcanizate of claim 1, wherein the polar group of the polysulfide crosslinking agent comprises —$CO_2R_1$, wherein $R_1$ is an alkyl, alkoxy, diol, ether, carbonyl or hydroxyl.

6. The vulcanizate of claim 1, wherein the polysulfide crosslinking agent is poly(S-Sty-r), wherein S is sulfur, Sty is styrene, and r is a polar group.

7. The vulcanizate of claim 6, wherein the polar group of the polysulfide crosslinking agent comprises —$CO_2R_1$, wherein $R_1$ is an alkyl, alkoxy, diol, ether, carbonyl or hydroxyl.

8. The vulcanizate of claim 1, wherein the step of combining introduces from about 5 to about 200 parts by weight of the filler per one hundred parts by weight of the elastomer and from about 0.5 to about 20 parts by weight of the polysulfide crosslinking agent per one hundred parts by weight of the elastomer.

9. The vulcanizate of claim 1, wherein the vulcanizate is a tire tread.

10. A vulcanizable composition comprising:
    a. an elastomer;
    b. from about 0.5 to about 20 parts by weight of polysulfide crosslinking agent comprising a polar group per one hundred parts by weight of the elastomer;
    c. from about 5 to about 200 parts by weight of filler per one hundred parts by weight of the elastomer; and
    d. a curative for the elastomer.

11. The vulcanizable composition of claim 10, wherein the polysulfide crosslinking agent is a distinct species in the vulcanizable composition.

12. The vulcanizable composition of claim 10, wherein the polysulfide crosslinking agent is covalently bonded to the elastomer.

13. The vulcanizable composition of claim 10, wherein the polar group of the polysulfide crosslinking agent comprises —$CO_2R_1$, wherein $R_1$ is an alkyl, alkoxy, diol, ether, carbonyl or hydroxyl.

14. The vulcanizable composition of claim 10, wherein the polysulfide crosslinking agent is poly(S-Sty-r), wherein S is sulfur, Sty is styrene, and r is a polar group, the polar group comprises —$CO_2R_1$, wherein $R_1$ is an alkyl, alkoxy, diol, ether, carbonyl or hydroxyl.

15. The vulcanizable composition of claim 10, further comprising a graft copolymer prepared by reacting the polysulfide crosslinking agent with the elastomer, wherein the elastomer is a diene-based elastomer.

16. The vulcanizable composition of claim 15, wherein the graft copolymer is prepared by
    a. introducing the diene-based elastomer and the polysulfide crosslinking agent to form a mixture; and
    b. subjecting the mixture to conditions that will react the polysulfide crosslinking agent to the diene-based elastomer.

17. The process of using the vulcanizable composition of claim 10 in the preparation of a tire tread.

18. An oligomeric polysulfide compound comprising a polar group represented by the following Formula (I): poly(S-Sty-r), wherein S is sulfur, Sty is styrene, and r is a polar group, the polar group comprises —$CO_2R_1$, wherein $R_1$ is an alkyl, alkoxy, diol, ether, carbonyl or hydroxyl.

19. A method for preparing a tire, the method comprising:
    a. combining an elastomer, a filler, and a polysulfide crosslinking agent comprising a polar group to form a masterbatch;
    b. adding a curative to the masterbatch to form a vulcanizable composition;
    c. forming the vulcanizable composition into a green tire component;
    d. building a green tire by incorporating the green tire component formed with the vulcanizable composition; and
    e. subjecting the green tire to curing conditions to form a vulcanized tire.

20. The method of claim 19, wherein the filler comprises silica and the tire component is a tire tread.

21. The method of claim 19,
    wherein the curing conditions for the green tire cause the polysulfide crosslinking agent to react with the elastomer,
    wherein the elastomer is a diene-based elastomer.

* * * * *